(12) United States Patent
Roebke

(10) Patent No.: US 11,849,209 B2
(45) Date of Patent: Dec. 19, 2023

(54) DYNAMICALLY OPERATING A CAMERA BASED ON A LOCATION OF THE CAMERA

(71) Applicant: Comoto Holdings, Inc., Philadelphia, PA (US)

(72) Inventor: Mark Jon Roebke, Gypsum, CO (US)

(73) Assignee: Comoto Holdings, Inc., Philadelphia, PA (US)

(*) Notice: Subject to any disclaimer, the term of this patent is extended or adjusted under 35 U.S.C. 154(b) by 0 days.

(21) Appl. No.: 18/073,009

(22) Filed: Dec. 1, 2022

(65) Prior Publication Data
US 2023/0171482 A1 Jun. 1, 2023

Related U.S. Application Data

(60) Provisional application No. 63/285,006, filed on Dec. 1, 2021.

(51) Int. Cl.
| H04N 23/62 | (2023.01) |
| H04N 23/65 | (2023.01) |
| H04N 23/667 | (2023.01) |
| H04N 5/77 | (2006.01) |
| H04N 23/70 | (2023.01) |

(52) U.S. Cl.
CPC .............. *H04N 23/62* (2023.01); *H04N 5/77* (2013.01); *H04N 23/651* (2023.01); *H04N 23/667* (2023.01); *H04N 23/70* (2023.01)

(58) Field of Classification Search
CPC .... H04N 23/661; H04N 23/64; H04N 23/651; H04N 23/70; H04N 23/667; H04N 23/62; H04N 5/77

USPC ........................................................ 348/222.1
See application file for complete search history.

(56) References Cited

U.S. PATENT DOCUMENTS

| 6,973,200 | B1* | 12/2005 | Tanaka | H04N 23/661 |
| | | | | 348/E7.086 |
| 10,467,498 | B2* | 11/2019 | Lee | G06V 10/751 |
| 10,701,282 | B2* | 6/2020 | El Choubassi | H04N 5/2627 |
| 11,074,460 | B1* | 7/2021 | Hodges | G06F 3/04855 |
| 11,290,652 | B2* | 3/2022 | Nishi | H04N 25/76 |
| 11,533,424 | B2* | 12/2022 | Sato | H04N 23/675 |
| 2016/0112644 | A1* | 4/2016 | Nishi | H04N 25/134 |
| | | | | 348/222.1 |
| 2017/0186290 | A1* | 6/2017 | Li | G08B 13/19645 |
| 2018/0060690 | A1* | 3/2018 | Lee | G06V 10/751 |
| 2018/0322197 | A1* | 11/2018 | Hesterman | G06F 16/75 |
| 2020/0092460 | A1* | 3/2020 | Nadeau | H04N 23/69 |
| 2020/0128171 | A1* | 4/2020 | Herson | H04N 7/18 |
| 2020/0280683 | A1* | 9/2020 | Sato | H04N 23/661 |
| 2022/0083619 | A1* | 3/2022 | Saini | H04N 1/00183 |

(Continued)

*Primary Examiner* — Pritham D Prabhakher
(74) *Attorney, Agent, or Firm* — Taylor English Duma LLP

(57) ABSTRACT

Methods, systems, and computer-readable storage media for dynamically operating a camera based on a location of the camera. A definition of a user-defined region and a set of rules for operating a camera within the user-defined region are obtained from a user. How to operate the camera within the user-defined region is then determined based on the set of rules. After receiving the definition of the user-defined region, it is determined whether the camera is located within the user-defined region, and upon determining that the camera is located within the user-defined region, the camera is to begin operation in accordance with the set of rules.

20 Claims, 5 Drawing Sheets

(56) References Cited

U.S. PATENT DOCUMENTS

2023/0089977 A1\* 3/2023 Venkatesh ............ G08G 5/0069
701/120

\* cited by examiner

DYNAMICALLY OPERATING A CAMERA BASED ON A LOCATION OF THE CAMERA

CROSS-REFERENCE TO RELATED APPLICATIONS

This application claims the benefit of U.S. Provisional Application No. 63/285,006 filed on Dec. 1, 2021, and entitled "CAMERA OPERATING SYSTEMS AND METHODS TO DYNAMICALLY OPERATE A CAMERA BASED ON A LOCATION OF THE CAMERA," the entire disclosure of which is hereby incorporated herein by this reference.

BRIEF SUMMARY

The present disclosure relates to technologies for dynamically operating a camera based on a location of the camera. According to some embodiments, a method comprises obtaining a definition of a user-defined region and a set of rules for operating a camera within the user-defined region and then determining how to operate the camera within the user-defined region is then determined based on the set of rules. After receiving the definition of the user-defined region, it is determined whether the camera is located within the user-defined region, and upon determining that the camera is located within the user-defined region, the camera is to begin operation in accordance with the set of rules.

According to further embodiments, a computer-readable medium comprises processor-executable instructions that cause one or more processors of a camera operating system to obtain a definition of a user-defined region and a set of rules for operating a camera within the user-defined region and determine how to operate the camera within the user-defined region based on the set of rules. After receiving the definition of the user-defined region, the processors determine whether the camera is located within the user-defined region, and upon determining that the camera is located within the user-defined region, dynamically request the camera to operate in accordance with the set of rules.

According to further embodiments, a system comprises a camera, an electronic device with a display, a storage medium, and one or more processors operably connected to the camera, the electronic device, and the storage medium. The processors are configured to provide a map display of a geographic region in a user-interface on the display of the electronic device to a user. The processors receive input from the electronic device corresponding to interaction of the user with the map display of the user interface, the input defining a user-defined region, and determine how to operate the camera within the user-defined region based on a set of rules for operation of the camera stored on the storage medium. The processors subsequently determine a current location of the camera and determine whether the current location of the camera is within the user-defined region. Upon determining that the camera is located within the user-defined region, the processors dynamically request the camera to operate in accordance with the set of rules.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
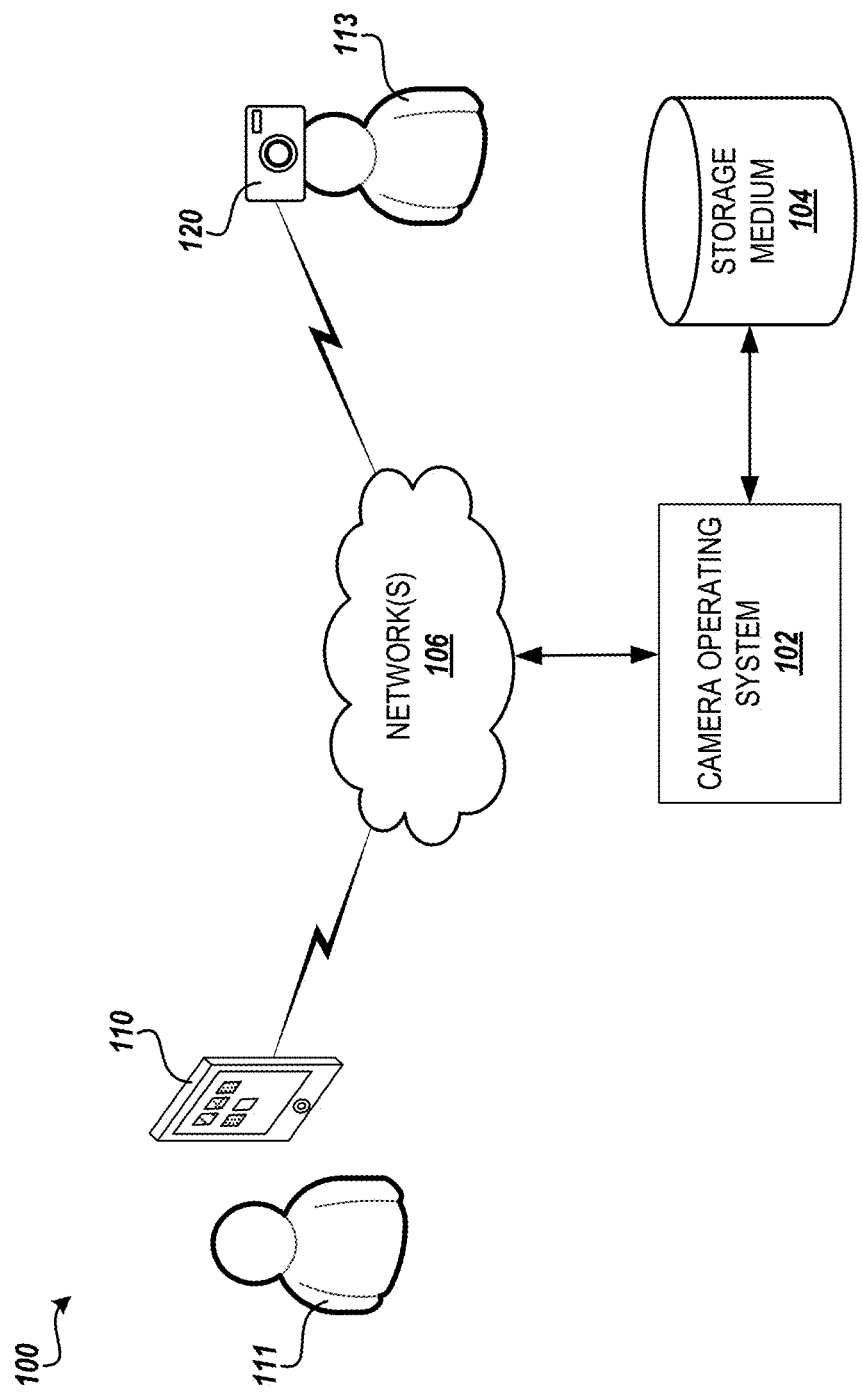
FIG. 1 is a block diagram showing an illustrative environment for dynamically operating a camera based on a location of the camera, according to embodiments presented herein.

The following detailed description is directed to technologies for dynamically operating a camera based on a location of the camera. Modern cameras are often utilized to capture pictures and videos of a person, an event, a point of interest, or an object of interest. Some cameras have physical actuator buttons, such as a power button or a shutter button that the user engages to turn on or off the camera, or to capture an image or video. Some cameras provide user-selectable affordances for display on a display screen. The user taps an area of the display screen over the user-selectable affordance to request the camera to perform a function corresponding to the selected user-selectable affordance. For example, where a zoom affordance is displayed on a display screen of the camera, the user taps an area of the display screen over the zoom affordance to zoom in on an image of video. However, physical buttons and user-selectable affordances are sometimes difficult to access. Other times, interacting with physical buttons or user-selectable affordances interrupt images and videos from being timely captured.

According to embodiments, an operating system of a camera obtains a user-defined region within which the user would like the camera operating system to control one or more camera operations of a camera. As referred to herein, a camera is any image or video capturing component or device. Examples of cameras include, but are not limited to DSLR cameras, mirrorless cameras, bridge cameras, compact cameras, film cameras, action cameras, smartphone cameras, smart device cameras, instant cameras, and other image or video capturing devices. Examples of camera operations include, but are not limited to, waking up the camera, turning on the camera's shutter, turning off the camera's shutter, adjusting the camera's shutter speed, adjusting frame rate and pixel density, adjusting a lens angle of the camera, capturing an image, capturing multiple images (burst shot), turning on/off flash, zooming in/out, capturing a video, cutting or slicing a video, putting the camera in sleep mode, and other functions of the camera.

In some embodiments, the camera operating system provides the user with a display of a representation of a geographic region, such as a map. The user interacts with the map to designate a region within which the user would like the camera operating system to operate the camera. In some embodiments, where the map is displayed on a touch screen, the user taps on the touch screen or controls a stylus to draw a closed loop that captures the region within which the user would like the camera operating system to operate the camera. The camera operating system converts the loop drawn by the user to a geographic border of a region within which the user would like the camera operating system to control the camera.

The camera operating system may also obtain a set of rules for operating the camera within the user-defined region. Examples of rules for operating the camera within the user-defined region include, but are not limited to, rules that define when to wake up or put to sleep the camera or certain components of the camera (e.g., shutter, audio components, network components, and other components of the camera), rules that define how to control the shutter speed of the camera, rules that define when and how to capture images and videos with the camera, dynamically created rules by the user while the user is within the user-defined region, prior user-defined rules created by the user and other similar users, and other types of rules that define how to operate the camera within the user-defined region.

The camera operating system may then determine, based on the set of rules, how to operate the camera within the user-defined region. For example, where the camera is affixed to a helmet of a rider a motorcycle through a course that includes a wooded area and an open terrain, one of the rules may specify adjusting the camera lens of the camera after the rider reaches the open terrain. The camera operating system dynamically tracks the current location of the camera (such as by GPS), and in response to a determination that the camera has reached the open terrain, dynamically adjusts the camera lens to account for the change in the environment around the rider. Continuing with the foregoing example, where one of the rules specifies adjusting the shutter speed based on an acceleration of the camera, the camera operating system dynamically determines whether the camera/rider is accelerating and the acceleration rate, and increase the shutter speed based on the detected acceleration and the acceleration rate.

Figure 2:
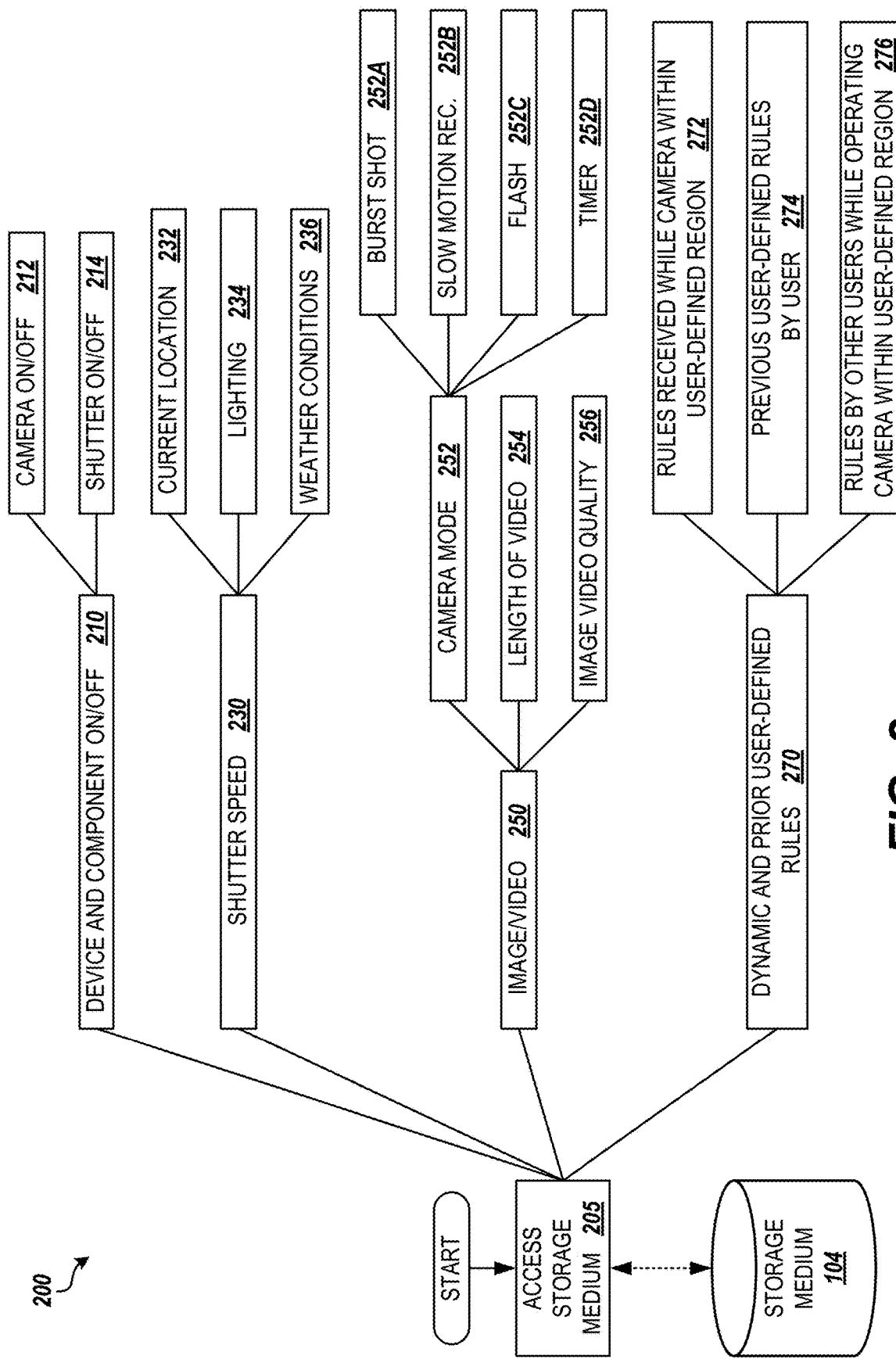
FIG. 2 is a tree diagram illustrating one process to determine, based on a set of criteria for operating the camera, how to operate the camera within a user-defined region, according to some embodiments.
Figure 3:
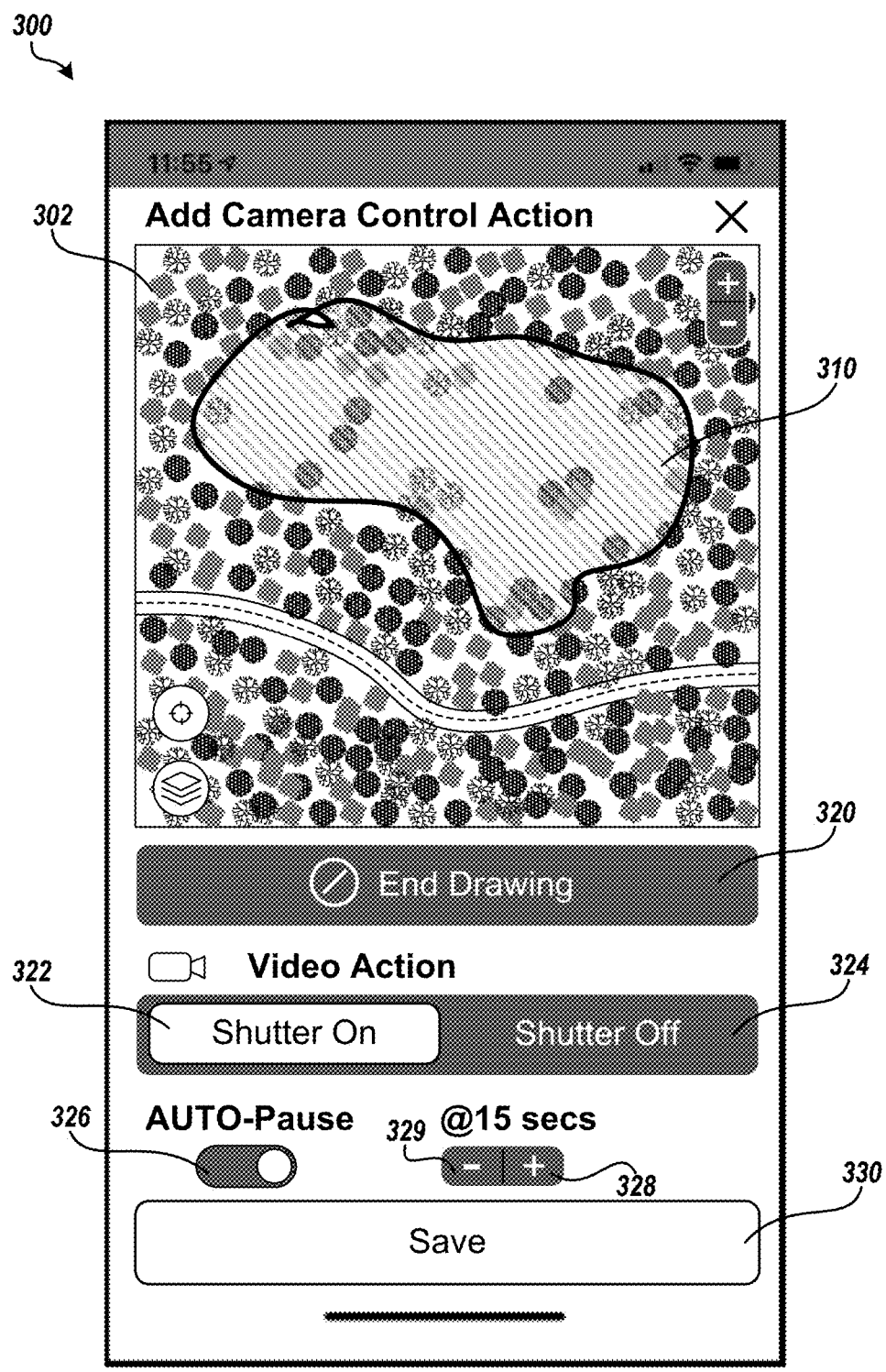
FIG. 3 is a screen diagram of an exemplary user-interface for designation by a user of a user-defined region and operating criteria for dynamic operation of a camera, according to some embodiments.

In some embodiments, the user provides the camera operating system (e.g., through an application user interface such as that illustrated in FIG. 3) with the set of rules. For example, the user may designate an area within the user-defined region to increase the shutter speed, and instructs the camera operating system to increase the shutter speed when the camera is within the user-designated area. In some embodiments, the camera operating system determines certain rules for operating the camera based on prior user-designated rules by the user, or based on prior user-defined rules made by other users provided such rules do not contradict the current user-defined rules. Additional descriptions of different rules that define how to operate the camera, how the camera operating system obtains or determines the rules, and how the camera operating system applies the rules to operate the camera are provided in the paragraphs below and shown at least in FIG. 2.

After the camera operating system receives the user-defined region, the camera operating system may periodically or continuously determine a current location of the camera. Further, and in response to a determination that the camera is located within the user-defined region, the camera operating system dynamically requests the camera to operate in accordance with the set of rules. Additional descriptions of the camera operating systems and methods to dynamically operate cameras are provided in the paragraphs below and are illustrated in at least FIGS. 1-5.

FIG. 1 shows an illustrative operating environment 100 for dynamically operating a camera based on a location of the camera, according to embodiments described herein. The environment 100 includes a camera operating system 102 that is communicatively connected to an electronic device 110 that is operated by a user 111 to control a camera 120 worn by (or to be worn by) user 113 via one or more networks 106.

Electronic device 110 includes any devices that are operable to receive a user input indicative of a user-defined region within which the user would like camera operating system 102 to control camera 120. In the embodiment of FIG. 1, electronic device 110 is a tablet device. Additional examples of electronic device 110 include, but are not limited to, smartphones, laptop computers, smart watches, virtual reality systems, augmented reality systems, as well as similar electronic devices having a processor operable to receive a user input indicative of a user-defined region within which the user would like camera operating system 102 to operate a camera.

In the embodiment of FIG. 1, electronic device 110 provides a map of a geographic region of interest for display on a touch screen of electronic device 110. User 111 controls a stylus to draw a closed loop indicative of the user-defined region on the touch screen of electronic device 110. In some embodiments, the user moves his or her fingers around the touch screen to draw a closed loop indicative of the user-defined region. In some embodiments, user 111 controls a mouse or moves his or her fingers across a track pad to draw the closed loop. In the embodiment of FIG. 1, user 111 also provides rules for operating camera 120 to electronic device 110. Data indicative of the user-defined region and the rules for operating camera 120 are transmitted from electronic device 110 to camera operating system 102.

Camera operating system 102 may be formed from one or more work management stations, server systems, desktop computers, laptop computers, tablet computers, cameras, smartphones, smart watches, virtual reality systems, augmented reality systems, as well as similar electronic devices having one or more processors operable to obtain a user-defined region and a set of rules for operating a camera within the user-defined region, determine, based on the set of rules, how to operate the camera within the user-defined region, after receiving the user-defined region, determine a location of the camera, and in response to a determination that the camera is located within the user-defined region, dynamically request the camera to operate in accordance with the set of rules. Additional descriptions of operations performed by camera operating system 102 are provided herein and are illustrated in at least FIGS. 2-5.

Camera operating system 102 includes or is communicatively connected to a computer-readable storage medium, such as storage medium 104. According to embodiments, storage medium 104 stores processor-executable instructions that when executed by one or more processors of camera operating system 102, cause the processors to perform the foregoing operations as well as other operations described herein. Storage medium 104, in addition to storing executable instructions, also stores information provided by electronic device 110, camera 120, and other components, modules, and devices of camera operating system 102 that contain instructions or data associated with operating camera 120 and other cameras (not shown). Storage medium 104 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices capable of storing processor-executable instructions and data in a non-transitory fashion. In some embodiments, storage medium 104 includes multiple data storage devices. In further embodiments, the multiple data storage devices may be physically located at different locations. In one of such embodiments, the data storage devices are components of a server station, such as a cloud server. In another one of such embodiments, the data storage devices are components of camera operating system 102.

Camera operating system 102, after obtaining the user-defined region and the rules for operating camera 120, determines, based on the rules, how to operate camera 120 within the user-defined region. Additional descriptions of operations performed by camera operating system 102 to determine how to operate camera 120 and other cameras (not shown) are provided in the paragraphs below and are illustrated in at least FIG. 2. Camera operating system 102 is communicatively connected to camera 120. Moreover, camera operating system 102, after receiving the user-defined region, also periodically or continuously determines a current location of camera 120. Further, camera operating system 102, after determining that camera 120 is located within the user-defined region, requests camera to perform functions and to operate in accordance with the rules set forth to operate camera within the user-defined region.

Camera 120 includes any image or video capturing component or device. In the embodiment of FIG. 1, camera is affixed to a headgear of user 113. In some embodiments, camera 120 is directly affixed to user 113, or another equipment or clothing worn by user 113. In some embodiments, camera 120 is placed within a threshold distance of user 113 (such as affixed to a car or motorcycle driven by user 113). In some embodiments, user 113 and user 111 are the same user.

Network(s) 106 can include, for example, any one or more of a cellular network, a satellite network, a personal area network (PAN), a local area network (LAN), a wide area network (WAN), a broadband network (BBN), a RFID network, a Bluetooth network, a device-to-device network, the Internet, and the like. Further, network(s) 106 can include, but is not limited to, any one or more of the following network topologies, including a bus network, a star network, a ring network, a mesh network, a star-bus network, a tree or hierarchical network, or similar network architecture. Network(s) 106 may be implemented using different protocols of the internet protocol suite such as TCP/IP. Network(s) 106 includes one or more interfaces for data transfer. In some embodiments, network(s) 106 include wired or wireless networking devices (not shown) operable to facilitate one or more types of wired and wireless communication between camera operating system 102, electronic device 110, camera 120, as well as other electronic devices (not shown) and systems (not shown) communicatively connected to network(s) 106. Examples of the networking device include, but are not limited to, wired and wireless routers, wired and wireless modems, access points, as well as other types of suitable networking devices described herein. Examples of wired and wireless communication include Ethernet, Wi-Fi, Cellular, LTE, GPS, Bluetooth, and RFID, as well as other types of communication modes described herein.

Although FIG. 1 illustrates electronic device 110, camera operating system 102, and camera 120 as separate electronic devices, in some embodiments, electronic device 110 is a component of camera operating system 102. In some embodiments, camera operating system 102 is a component of camera 120. In some embodiments, electronic device 110 is a component of camera 120. In some embodiments, electronic device 110, camera operating system 102, and camera 120 are components of a single electronic device. Further, although FIG. 1 illustrates one camera 120 and one electronic device 110, in some embodiments, camera operating system 102 is configured to obtain multiple user-defined regions from multiple users (not shown) and configured to perform operations performed herein to sequentially or concurrently operate multiple different cameras within multiple user-defined regions.

FIG. 2 illustrates a process 200 to determine how to operate a camera, such as camera 120 of FIG. 1, within the user-defined region in accordance with some embodiments. Although operations in the process 200 are shown in a particular order or sequence and within particular categories and subcategories in a tree structure, it will be appreciated that certain operations may be performed in different sequences or at the same time where feasible. Further, in some embodiments, different combinations of some or all of the operations of the process 200 are performed to determine how to operate the camera 120 within the user-defined region.

At block 205, camera operating system 102 accesses storage medium 104 to obtain rules for operating the camera 120, and instructions on how to apply the rules to operate the camera. In the depicted embodiment, rules for operating the camera 120 are categorized into several sub-categories, including rules that define whether to turn the camera or components of the camera on or off, rules that define how to adjust the shutter speed of the camera, rules that define how and when to capture images and videos, rules that are dynamically provided by the user while the user is in the user-defined region, and prior user-provided rules. Further, camera operating system 102 performs operations illustrated in FIG. 2 to determine how to operate the camera 120 based on each sub-category of the rules.

At block 210, camera operating system 102 accesses a first sub-category of rules that define when to turn on or off the camera 120 or certain components of the camera. At block 212, camera operating system 102 determines when to turn camera on or wake up the camera, and when to turn the camera off or request the camera to enter into sleep mode. In some embodiments, camera operating system 102 determines to wake up the camera 120 within the camera is determined to be within a threshold distance (e.g., 10 feet, 20 feet, 100 feet, or another threshold distance) of the user-defined region, and to request the camera to enter into sleep mode when the camera is not within the threshold distance of the user-defined region to conserve energy. In some embodiments, the threshold distance is a distance that is defined by the user 111. In some embodiments, the threshold distance is a distance dynamically determined by the camera operating system 102 based on the battery life of the camera 120 and whether the battery is being recharged. At block 214, camera operating system 102 determines when to turn the camera's shutters on or off. In some embodiments, the user defines specific areas within the user-defined region to turn on the shutter, such as for example, near a point of interest, while the user is in motion, or in response to an audio command from the user. In some embodiments, the user 111 also defines specific areas to turn off the shutter, such as in a parking lot, near a restroom, or near another area where the camera 120 is not expected to capture images or videos. In some embodiments, camera operating system 102 dynamically determines to turn shutter on or off based on the amount of the user's motion within a threshold period of time. In one or more of such embodiments, camera operating system 102, in response to a determination that the user 113 has not moved for more than a threshold period of time (e.g., for more than one minute, or another threshold period of time), instructs the camera 120 to turn the shutter off. Moreover, camera operating system 102 in response to a subsequent determination that the user 113 is in motion or is moving faster than a threshold rate (e.g., ten feet per minute, five feet per minute, or another threshold rate), instructs the camera 120 to turn the shutter back on.

At block 230, camera operating system 102 accesses a second sub-category of rules that define how to adjust the camera's shutter speed. At block 232, camera operating system 102 determines how to adjust the camera's shutter speed based on a current location of the camera 120. In some embodiments, the user 111 defines specific locations or areas within the user-defined region to increase or decrease the shutter speed. For example, where the user-defined region is a racetrack, the user 111 further defines a rule to request the camera 120 to increase the shutter speed when the camera is within a threshold distance of a straightaway of the racetrack to capture images of race cars traveling along the straightaway. In some embodiments, camera operating system 102 also dynamically determines certain areas within the user-defined region (such as when the camera is within a threshold distance of the start/finish line) to increase or adjust the shutter speed of the camera 120 and requests the camera to dynamically adjust the shutter speed while the camera is within such areas.

At block 234, the camera operating system determines the amount of light captured by the camera 120 and requests the camera to adjust the shutter speed based on the amount of light that is captured by the camera. At block 236, when the camera is within the user-defined region, the camera operating system 102 determines the current or expected weather at the current location of the camera 120 and requests the camera to adjust the shutter speed based on the current or expected weather at the current location of the camera.

At block 250, camera operating system 102 accesses a third sub-category of rules that define how to capture images and videos with the camera 120. At block 252, camera operating system 102 determines how to adjust one or more modes of the camera 120 to capture an image or video. Examples of camera modes include, but are not limited to, burst shot mode, slow motion recording mode, time-lapse recording mode, flash mode, timer mode, and other available modes for capturing images or videos. At block 252A, camera operating system 102 determines whether to take a burst shots. In some embodiments, camera operating system 102, in response to a determination that the user 113 is taking pictures of a fast-moving object, such as a sprinter competing in a sprint, requests the camera 120 to capture burst shots of the sprinter. At block 252B, camera operating system 102 determines whether to record a video as a slow motion video. In some embodiments, camera operating system 102, in response to a determination that the user 113 is recording a video of a fast moving object, such as a race car, requests the camera 120 to record the video as a slow moving video. At blocks 252C and 252D, camera operating system 102 determines whether activate flash and timer, respectively.

At block 254, camera operating system 102 determines the length of a captured video. In some embodiments, where the user 111 defines a maximum length of a video, camera operating system 102 requests the camera 120 to stop recording when the video has reached the maximum length.

In one or more or such embodiments, camera operating system 102 also requests the camera 120 to begin a new recording once the current video has reached the maximum length. In some embodiments, camera operating system 102 dynamically determines whether to start and stop recording. In one or more or such embodiments, camera operating system 102 determines whether to start or stop recording based on the user's motion or lack of motion. In one or more or such embodiments, camera operating system 102 determines whether to start or stop recording based on the content captured by the video. For example, where the user has stopped his snowmobile to assist another snowmobile rider, camera operating system 102 in response to a determination that the user 113 is not moving or moving less than a threshold rate, and/or in response to a determination that the video has been recording the ground (or another object of little or no interest) for a threshold period of time, stops the recording. Further, camera operating system 102 in response to a subsequent determination that the user 113 is again in motion, and/or in response to a subsequent determination that the camera 120 is pointing to a direction or point of interest, restarts the recording.

At block 256, camera operating system 102 determines how to adjust the quality of the image or video that is being captured by the camera 120. In some embodiments, camera operating system 102 determines whether to zoom in or out, adjust the lens angle, adjust the point/object of focus, and other adjustments to the image or video that is being captured by the camera 120. For example, where the user 113 is riding a snowmobile through a forested area that eventually opens to a plain, camera operating system 102, in response to a determination that the user is exiting the forested area, dynamically requests the camera 120 to adjust the lens angle of the camera to a wider angle to capture the surrounding plain as the user exits the forested area. Similarly, camera operating system 102, in response to a determination that the camera 120 is capturing an image or video of a wildlife that is out of focus, dynamically requests the camera to zoom in on the wildlife until the wildlife is in focus.

At block 270, camera operating system 102 accesses a fourth sub-category of rules that are dynamically provided by the user 111, 113 while the user is in the user-defined region, or are prior user-provided rules. At block 272, camera operating system 102 determines new rules on operating the camera 120 that are provided by the user 111, 113 while the user is in the user-defined region, updates existing rules, and resolves, alters, or removes prior rules that contradict with the newly provided rules. At block 274, camera operating system 102 determines whether to apply previous user-defined rules by the user 111. For example, camera operating system 102 in response to a determination that the user 111 has previously requested videos to be recorded at 100 frames per second with a maximum length of 10 minutes, also requests the camera 120 to record any new videos at 100 frames per second with a maximum length of 10 minutes. At block 276, camera operating system 102 determines whether to apply rules defined by other users while operating a similar camera within or within a threshold range of the user-defined region.

Although the foregoing paragraphs describe operations dynamically performed by camera operating system 102, in some embodiments, the user 111 defines how the camera 120 should perform some or all of the operations illustrated in FIG. 2. For example, in some embodiments, the user 111 specifies how to adjust the camera mode, the length of the video, and the image and video quality of images and videos captured by the camera 120, such as through the user interface illustrated in FIG. 3. In some embodiments, where the user 111 does not explicitly define every rule, camera operating system 102 dynamically determines some rules described herein provided such rules do not contradict rules explicitly defined by the user. In certain embodiments, camera operating system 102 applies a weighted system to different rules. For example, rules defined by the user 111 are given a first weight, and rules defined by other users are given a second weight that is less than the first weight or zero weight if such rules contradict rules defined by the user. In some embodiments, camera operating system 102 only performs some of the operations illustrated in FIG. 2. Further, in some embodiments, camera operating system 102 executes the instructions described in the foregoing paragraphs to simultaneously perform multiple or all of the operations illustrated in FIG. 2.

FIG. 3 shows an illustrative user-interface 300 with which the user 111 may interact to designate a user-defined region, in accordance with some embodiments. According to some embodiments, user-interface 300 may displayed on a touch screen of electronic device 110 of FIG. 1, or on another electronic device. User-interface 300 may provide a map display 302 for a geographic region. The user 111 may tap and drag on the touch screen—drawing on top of the map display 302 with the user's finger. In response, electronic device 111 or camera operating system 102 determines the definition of a user-defined region 310. In some embodiments, the user defined region 310 may comprise a complex region definition that is not limited to basic square or circle shapes. More particularly, the user 111 inputs a user-defined region that takes into account geographic features (mountains, rivers, trees, etc.), trail systems, or sections of a racetrack to provide user customization. In some embodiments, the touch screen of the electronic device 110 is defined as a 2-dimensional rectangle overlaid by an X, Y coordinate system based on pixels as the unit of measure. In such embodiments, any touch on the touch screen is represented by an X, Y pixel coordinate in the touch screen's coordinate system.

While the user 111 is drawing with their finger, camera operating system 102 converts the location of the touch on the touch screen (X, Y) to a map coordinate (latitude, longitude) and stores it in an ordered array. This array defines the geographic 'border' of the user-defined region 310 and, in turn, a complex polygon. The user 111 may select an end drawing affordance 320 to confirm the user-defined region 310 has been correctly inputted. In some embodiments, where the user 111 stops short of connecting the last point to the first point, camera operating system 102 automatically connects the first and last point to ensure a closed region/polygon. In one or more of such embodiments, camera operating system 102 extends a straight line from the first and last point to close the loop. In one or more of such embodiments, where there is a point of interest within a threshold distance of the first and last points, camera operating system 102 closes the loop by including the point of interest inside the user-defined region 310. The array of points that define the user-defined region 310 are stored in a database of camera operating system 102, such as storage medium 104, along with a user-defined name and other information regarding the user 111 and the user-defined region.

According to further embodiments, after a user-defined region 310 has been inputted, the user 111 chooses what actions to perform on the camera 120. In the embodiment of FIG. 3, the user turns the shutter on while the camera is within the user-defined region by selecting a shutter on affordance 322, or turns the shutter off by selecting shutter off affordance 324. The user also selects whether to auto-pause a video that is being recorded while the user is within the user-defined region 310 by toggling an auto-pause toggle 326. In some embodiments, once auto-pause is toggled on, related criteria for auto-pausing a video may also be specified, such as whether the camera is motionless or moving less than a threshold rate (e.g., one foot per second, three feet per second, or another rate) for a threshold period of time. For example, the user 111 may select the threshold period of time during which the user is motionless or moving less than the threshold rate by interacting with + or − affordances 328 and 329, respectively. As shown in FIG. 3, the threshold period of time during which the user is motionless or moving less than the threshold rate is set at 15 seconds. The user selects a save affordance 330 to finalize the user-defined region and the user-defined rules on how to operate the camera 120 within the user-defined region 310.

Although FIG. 3 illustrates two user selectable options to define when to turn on the shutter, and whether to auto pause videos, in some embodiments, user-interface 300 also provides additional user interactive affordances (not shown) that allows the user to define other rules on how to operate the camera including, but not limited to, setting and adjusting the resolution, aspect ratio, frame rate, video to photo mode, photo to video mode, simultaneous video and photo mode, time lapse, and other operations described herein or operations the camera is configured to perform.

Figure 4:
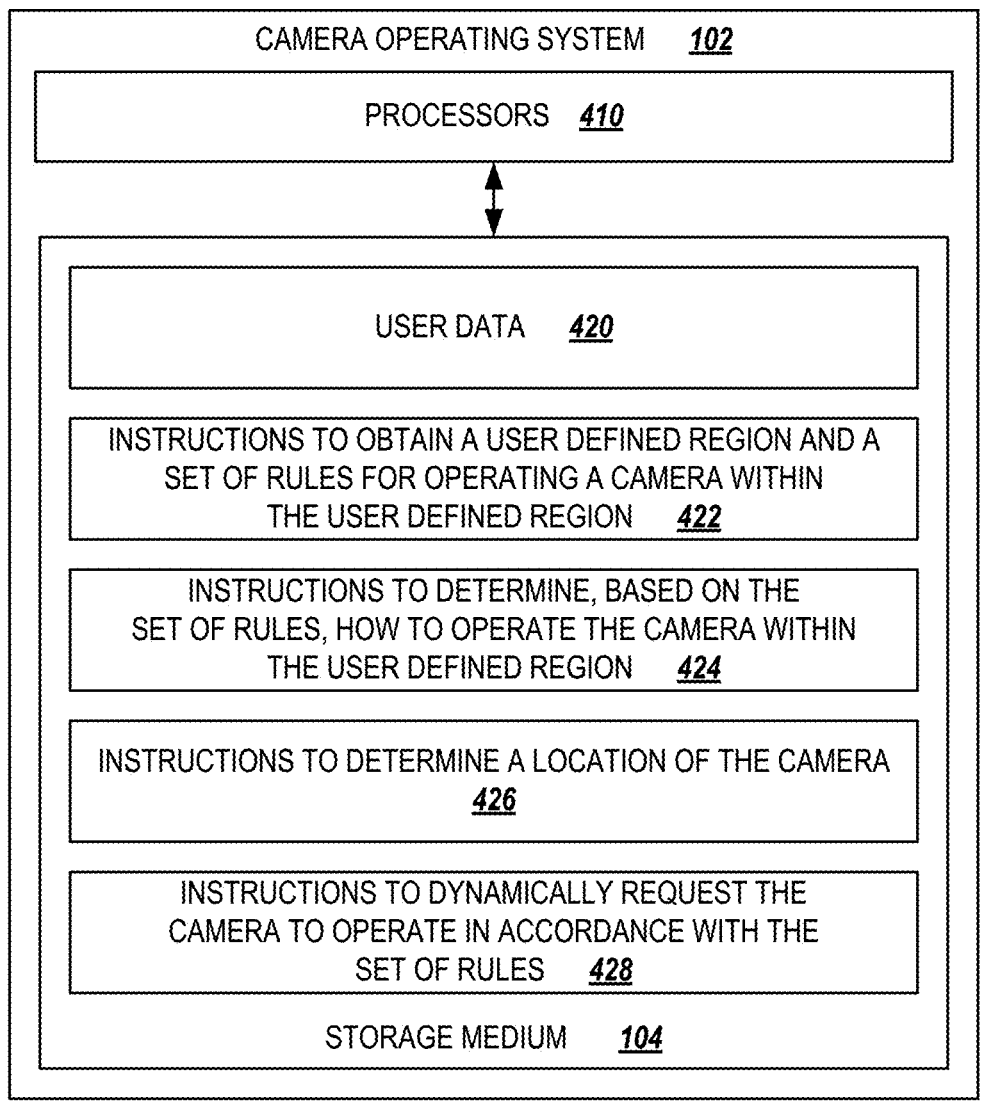
FIG. 4 is a system diagram of an exemplary camera operating system for dynamically operating a camera based on a location of the camera, according to some embodiments.

FIG. 4 shows a block diagram of camera operating system 102, according to some embodiments. Camera operating system 102 includes or is communicatively connected to storage medium 104 and processors 410. It will be appreciated that processors 410 shown in FIG. 4 may represent conventional programmable processing resources, including microprocessors in mobile computing devices and/or digital camera devices, central processing units ("CPUs") in server computers, virtualized processing resources in cloud-based computing systems, and any combination of these and other processing resources known in the art capable of performing arithmetic and logical operations necessary for the operation of the camera operating system 102.

Data indicative of the user's selection of the user-defined region 310, the user's preferences, rules defined by the user 111, prior rules defined by the user, and rules defined by other users (collectively "user data") are stored at location 420 of storage medium 104. Processor-executable instructions to obtain a user-defined region 310 and a set of rules for operating a camera 120 within the user-defined region are stored at location 422. Further, processor-executable instructions to determine, based on the set of rules, how to operate the camera 120 within the user-defined region 310 are stored at location 424. Further, processor-executable instructions to determine a location of the camera 120 are stored at location 426. Further, processor-executable instructions to dynamically request the camera 120 to operate in accordance with the set of rules are stored at location 428. Further, processor-executable instructions to perform operations described herein and shown in at least FIGS. 2 and 5 are also stored in storage medium 104.

Figure 5:
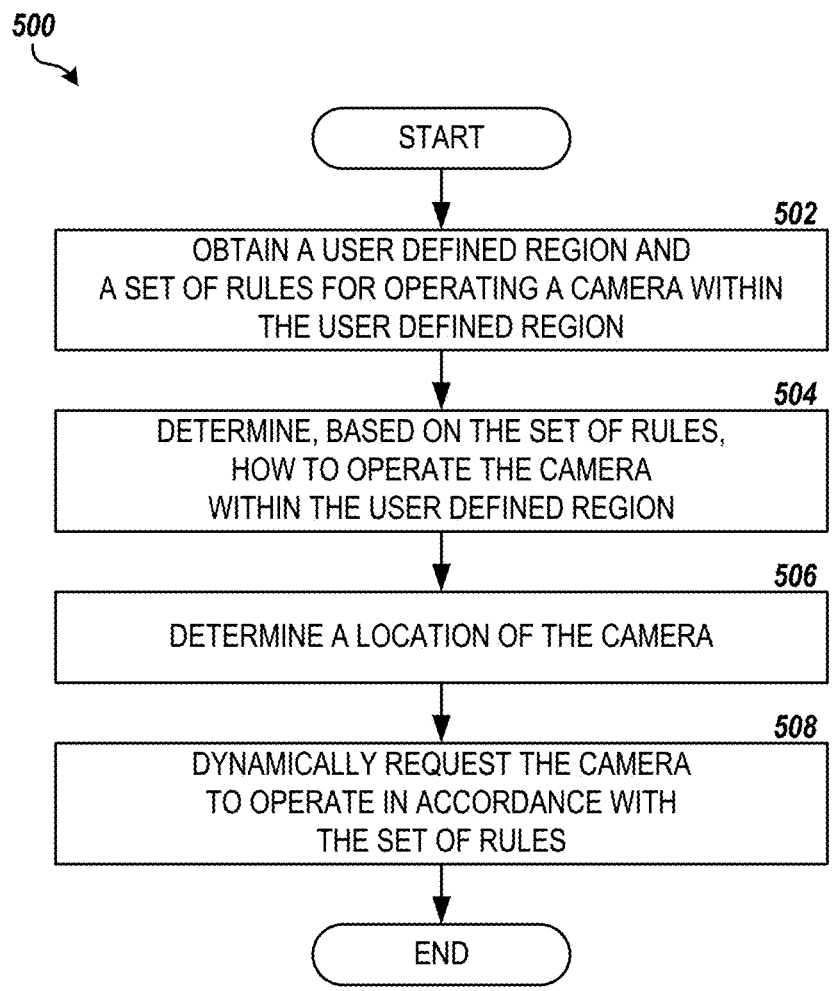
FIG. 5 is a flow diagram showing one routine for dynamically operate a camera based on a location of the camera, according to embodiments presented herein.

FIG. 5 shows one routine 500 to dynamically operate a camera based on a location of the camera, according to some embodiments. In some embodiments, parts of the routine 500 may be performed by the camera operating system 102 executing on processors 410 of the electronic device 110 and the camera 120 communicating with server processing resources over the network(s) 106. In other embodiments, the routine 500 may be performed by some combination of the electronic device 110, the camera 120, and other computing devices, components, and modules of the camera operating system 102.

At block 502, the camera operating system 102 obtains a user-defined region 310 and a set of rules for operating a camera 120 within the user-defined region. For example, as shown in FIG. 3, a user 111 interacting with a touch screen of an electronic device 110 may input the user-defined region 310 and rules regarding when to turn on and off the shutter of the camera and auto-pause functionality in relation to the user-defined region. FIG. 1, for example, illustrates camera operating system 102 obtaining user-defined region 310 and an associated set of rules for operating camera 120 from electronic device 110. In some embodiments, where electronic device 110 is a component of the camera operating system 102, the camera operating system directly obtains the user-defined region 310 and the set of rules for operating the camera 120 within the user-defined region. At block 504, the camera operating system 102 determines, based on the set of rules, how to operate the camera 120 within the user-defined region 310. FIG. 2, for example, shows a tree diagram illustrating process 200 to determine, based on the set of rules, how to operate the camera 120 within the user-defined region 310.

At block 506, and after receiving the definition of the user-defined region 310, the camera operating system 102 determines a location of the camera 120. The camera operating system 102 may dynamically track the current location of the camera 120 using a GPS device of the camera 120, the electronic device 110, or another component of the camera operating system associated with and residing in close proximity to the camera. At block 508, the camera operating system 102, in response to a determination that the camera 120 is located within the user-defined region 310, dynamically requests the camera to operate in accordance with the set of rules. In some embodiments, determination that the camera 120 is located within the user-defined region 310 may be accomplished using any number of geofencing algorithms known in the art, including ray casting and even-odd rule.

Based on the foregoing, it will be appreciated that technologies for dynamically operating a camera based on a location of the camera are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A computer-implemented method of dynamically operating a camera based on a location of the camera, the method comprising:

obtaining, by a camera operating system, a definition of a user-defined region and a set of rules for operating a camera within the user-defined region;

determining, by the camera operating system, how to operate the camera within the user-defined region based on the set of rules;

after receiving the definition of the user-defined region, determining, by the camera operating system, whether the camera is located within the user-defined region; and upon determining that the camera is located within the user-defined region, dynamically requesting, by the camera operating system, the camera to operate in accordance with the set of rules.

2. The computer-implemented method of claim 1, further comprising:

in response to a determination that the camera is not located within the user-defined region, requesting the camera to go into a sleep mode; and in response to a determination that the camera is located within the user-defined region while the camera is in sleep mode, requesting the camera wake up from the sleep mode.

3. The computer-implemented method of claim 1, further comprising:

providing, by the camera operating system, a map display of a geographic region containing the user-defined region in a user-interface on an electronic device of a user; and receiving, by the camera operating system, input from the electronic device corresponding to interaction of the user with the map display of the user interface, the input defining the user-defined region.

4. The computer-implemented method of claim 3, further comprising:

receiving, by the camera operating system, additional input from the electronic device corresponding to further interaction of the user with the user-interface, the additional input defining at least a portion of the set of rules for operation of the camera within the user-defined region.

5. The computer-implemented method of claim 1, wherein the set of rules for operating the camera comprises one or more of rules on when to turn on or off one or more components of the camera, rules on how to adjust a shutter speed of the camera, and rules on when and how to capture image or video.

6. The computer-implemented method of claim 5, wherein one rule of the set of rules specifies when to turn on a shutter of the camera based on a current location of the camera in relation to the user-defined region.

7. The computer-implemented method of claim 5, wherein one rule of the set of rules specifies how to adjust the shutter speed based on an amount of light captured by the camera at a current location of the camera.

8. The computer-implemented method of claim 5, wherein one rule of the set of rules specifies how to adjust a mode of the camera based on a current location of the camera.

9. The computer-implemented method of claim 5, wherein one rule of the set of rules specifies how to adjust a length of a video recorded by the camera based on a current location of the camera.

10. A non-transitory computer-readable storage medium containing processor-executable instructions that, when executed by processors of a camera operating system, cause the camera operating system to:
   obtain a definition of a user-defined region and a set of rules for operating a camera within the user-defined region;
   determine how to operate the camera within the user-defined region based on the set of rules;
   after receiving the definition of the user-defined region, determine whether the camera is located within the user-defined region; and
   upon determining that the camera is located within the user-defined region, dynamically request the camera to operate in accordance with the set of rules.

11. The non-transitory computer-readable storage medium of claim 10, containing further processor-executable instructions that cause the camera operating system to:
   provide a map display of a geographic region that includes the user-defined region in a user-interface on an electronic device of a user; and
   receive input from the electronic device corresponding to interaction of the user with the map display of the user interface, the input defining the user-defined region.

12. The non-transitory computer-readable storage medium of claim 11, containing further processor-executable instructions that cause the camera operating system to:
   receive additional input from the electronic device corresponding to further interaction of the user with the user-interface, the additional input defining at least a portion of the set of rules for operation of the camera within the user-defined region.

13. The non-transitory computer-readable storage medium of claim 10, further containing one or more of rules on when to turn on or off one or more components of the camera, rules on how to adjust a shutter speed of the camera, and rules on when and how to capture image or video comprising the set of rules for operating the camera.

14. The non-transitory computer-readable storage medium of claim 13, wherein one rule of the set of rules specifies when to turn on a shutter based on a current location of the camera in relation to the user-defined region.

15. The non-transitory computer-readable storage medium of claim 13, wherein one rule of the set of rules specifies adjusting the shutter speed based on an acceleration of the camera, the computer-readable storage medium containing further processor-executable instructions that cause the camera operating system to dynamically determine an acceleration rate of the camera and increase or decrease the shutter speed based on the determined acceleration rate of the camera.

16. The non-transitory computer-readable storage medium of claim 13, wherein the camera operating system applies a weighted system on the set of rules, where certain rules have a higher weight than other rules.

17. A system comprising:
   a camera;
   an electronic device comprising a display;
   a storage medium; and
   one or more processors operably connected to the camera, the electronic device, and the storage medium and configured to:
      provide a map display of a geographic region in a user-interface on the display of the electronic device to a user,
      receive input from the electronic device corresponding to interaction of the user with the map display of the user interface, the input defining a user-defined region,
      determine how to operate the camera within the user-defined region based on a set of rules for operation of the camera stored on the storage medium,
      determine a current location of the camera,
      determine whether the current location is within the user-defined region, and
      upon determining that the current location is within the user-defined region, dynamically request the camera to operate in accordance with the set of rules.

18. The system of claim 17, wherein the one or more processors are further configured to:
   receive additional input from the electronic device corresponding to further interaction of the user with the user-interface, the additional input defining at least a portion of the set of rules for operation of the camera within the user-defined region; and
   store the at least a portion of the set of rules on the storage medium.

19. The system of claim 17, wherein determining the current location of the camera comprises receiving a location of the camera from a GPS device associated with the camera.

20. The system of claim 17, wherein at least a portion of the set of rules for operation of the camera within the user-defined region comprises user-defined rules for operating the camera defined by the user prior to defining the user-defined region.

* * * * *